(12) United States Patent
Seblante, Sr.

(10) Patent No.: US 9,163,706 B2
(45) Date of Patent: Oct. 20, 2015

(54) SPROCKET BOX FOR INCREASING THE GAS MILEAGE OF A VEHICLE WITH AN AUTOMATIC TRANSMISSION

(71) Applicant: Greg Seblante, Sr., Palatine, IL (US)

(72) Inventor: Greg Seblante, Sr., Palatine, IL (US)

( * ) Notice: Subject to any disclaimer, the term of this patent is extended or adjusted under 35 U.S.C. 154(b) by 148 days.

(21) Appl. No.: 14/014,345

(22) Filed: Aug. 29, 2013

(65) Prior Publication Data

US 2014/0066242 A1 Mar. 6, 2014

Related U.S. Application Data

(60) Provisional application No. 61/694,648, filed on Aug. 29, 2012.

(51) Int. Cl.
*F16H 7/00* (2006.01)
*F16H 7/06* (2006.01)

(52) U.S. Cl.
CPC .................................... *F16H 7/06* (2013.01)

(58) Field of Classification Search
CPC ............ F16H 7/02; F16H 7/24; F16H 7/023; F16H 9/14; B62M 1/36
USPC ...................................................... 474/88, 84
See application file for complete search history.

(56) References Cited

U.S. PATENT DOCUMENTS

| | | | | |
|---|---|---|---|---|
| 169,380 A * | 11/1875 | Smith | .............................. | 474/88 |
| 242,256 A * | 5/1881 | Boothroyd | ....................... | 474/88 |
| 1,622,698 A * | 3/1927 | Barke et al. | ...................... | 474/78 |
| 1,805,819 A * | 5/1931 | Goeser | ............................. | 474/73 |
| 1,957,614 A * | 5/1934 | Allen | ............................... | 474/73 |
| 2,108,315 A * | 2/1938 | Liguori | ............................ | 74/1 R |
| 2,655,003 A * | 10/1953 | Young | ............................. | 60/714 |
| 2,851,892 A * | 9/1958 | Parkinson et al. | .............. | 474/88 |
| 2,910,889 A * | 11/1959 | Lackey | ............................ | 74/661 |
| 2,959,070 A * | 11/1960 | Flinn | ............................... | 74/664 |
| 3,118,311 A * | 1/1964 | Francis | .......................... | 474/13 |
| 3,191,452 A * | 6/1965 | Lipski et al. | .................... | 74/384 |
| 3,626,772 A * | 12/1971 | Gutzmer | ............................ | 74/4 |
| 3,747,721 A * | 7/1973 | Hoff | .............................. | 180/230 |
| 3,813,956 A * | 6/1974 | Whitecar | ........................ | 474/88 |
| 3,853,432 A * | 12/1974 | Cronstedt | ..................... | 417/405 |
| 3,884,097 A * | 5/1975 | Avramidis et al. | ............. | 475/208 |
| 4,028,964 A * | 6/1977 | Jones | .......................... | 74/606 R |
| 4,259,874 A * | 4/1981 | Guirriec | .......................... | 474/28 |
| 4,484,901 A * | 11/1984 | Toti et al. | ........................ | 474/28 |
| 4,661,086 A * | 4/1987 | Railsback | ........................ | 474/84 |
| 4,741,546 A * | 5/1988 | Reswick | ........................ | 280/236 |
| 4,870,516 A * | 9/1989 | Hoover et al. | ................ | 360/96.3 |
| 4,875,893 A * | 10/1989 | Giacosa | ........................... | 474/28 |
| 5,038,629 A * | 8/1991 | Takimoto | ..................... | 74/421 A |
| 5,154,574 A * | 10/1992 | Reinhorn et al. | ........... | 415/124.1 |
| 5,186,692 A * | 2/1993 | Gleasman et al. | .............. | 475/82 |
| 5,215,323 A * | 6/1993 | Cowan | ........................... | 280/236 |
| 5,323,737 A * | 6/1994 | Farrell | ......................... | 123/18 A |

(Continued)

*Primary Examiner* — Henry Liu

(57) ABSTRACT

A sprocket box for increasing the gas mileage of a vehicle with an automatic transmission is positioned between the back of an engine block and the torque converter. The sprocket box is fed the rotational motion from the engine and doubles the rotational motion being fed into the torque converter in order to increase the fluid pressure felt within the torque converter. Thus, the sprocket box is used to increase the fuel economy of the vehicle. The rotation motion from the engine is transferred and modified by the sprocket box by using an input assembly of sprockets and a roller chain and by using an output sprocket of more sprockets and another roller chain.

5 Claims, 6 Drawing Sheets

(56) References Cited

U.S. PATENT DOCUMENTS

| | | | |
|---|---|---|---|
| 5,637,046 A * | 6/1997 | Ha | 474/53 |
| 5,730,672 A * | 3/1998 | Lin | 474/88 |
| 5,833,566 A * | 11/1998 | Showalter | 475/198 |
| 5,853,342 A * | 12/1998 | Pritchard et al. | 475/206 |
| 5,954,612 A * | 9/1999 | Baxter, Jr. | 475/198 |
| 6,267,701 B1 * | 7/2001 | Mott | 474/164 |
| 6,293,888 B1 * | 9/2001 | Moon | 475/210 |
| 6,421,903 B2 * | 7/2002 | Brown | 29/428 |
| 6,537,175 B1 * | 3/2003 | Blood | 477/44 |
| 6,659,910 B2 * | 12/2003 | Gu et al. | 477/6 |
| 6,830,142 B2 * | 12/2004 | Weilant | 192/84.92 |
| 6,905,432 B2 * | 6/2005 | Oser | 474/141 |
| 6,926,632 B2 * | 8/2005 | Brown | 474/35 |
| 6,964,317 B2 * | 11/2005 | Groves et al. | 180/344 |
| 7,100,472 B2 * | 9/2006 | Haka | 74/665 GE |
| 7,128,671 B2 * | 10/2006 | Gu et al. | 474/23 |
| 7,163,483 B2 * | 1/2007 | Haka | 475/212 |
| 7,217,205 B2 * | 5/2007 | Frank | 474/28 |
| 7,231,848 B2 * | 6/2007 | Breen et al. | 74/665 GE |
| 7,540,815 B2 * | 6/2009 | Brown | 474/27 |
| 2004/0238245 A1 * | 12/2004 | Gu et al. | 180/65.2 |
| 2005/0107193 A1 * | 5/2005 | Frank | 474/8 |
| 2005/0215377 A1 * | 9/2005 | Haka | 475/210 |
| 2006/0154760 A1 * | 7/2006 | Brown | 474/27 |
| 2009/0239690 A1 * | 9/2009 | Brown | 474/30 |
| 2011/0114406 A1 * | 5/2011 | Gibson et al. | 180/165 |
| 2011/0179890 A1 * | 7/2011 | Swales et al. | 74/6 |
| 2011/0266770 A1 * | 11/2011 | Beraka | 280/287 |
| 2012/0058853 A1 * | 3/2012 | Schoon et al. | 475/5 |
| 2013/0005523 A1 * | 1/2013 | Suchecki | 474/101 |
| 2013/0237352 A1 * | 9/2013 | Braford, Jr. | 474/73 |

* cited by examiner

SPROCKET BOX FOR INCREASING THE GAS MILEAGE OF A VEHICLE WITH AN AUTOMATIC TRANSMISSION

The current application claims a priority to the U.S. Provisional Patent application Ser. No. 61/694,648 filed on Aug. 29, 2012.

FIELD OF THE INVENTION

The present invention relates generally to the field of automotive emissions. More specifically, the present invention is a sprocket box for a device that significantly increases an automobile's fuel efficiency.

BACKGROUND OF THE INVENTION

There are many automotive parts on the market today that offer different performance enhancements. Most products offer increase a vehicle's horsepower, but with the sacrifice of fuel efficiency. With rising gasoline prices, fuel efficiency has become a very important factor in an automobiles performance. Older vehicles, by design, have lower fuel efficiency due to gas prices being much lower during their period of production. There is currently not much a driver can do to significantly increase the fuel efficiency of their older model vehicle. Therefore, it is an objective of the present invention to introduce an apparatus that enables vehicles with automatic transmission to gain significant increases in fuel efficiency. When properly installed, the present invention may increase these vehicles' fuel efficiency by about 80% or more.

DETAILED DESCRIPTIONS OF THE INVENTION

Figure 1:
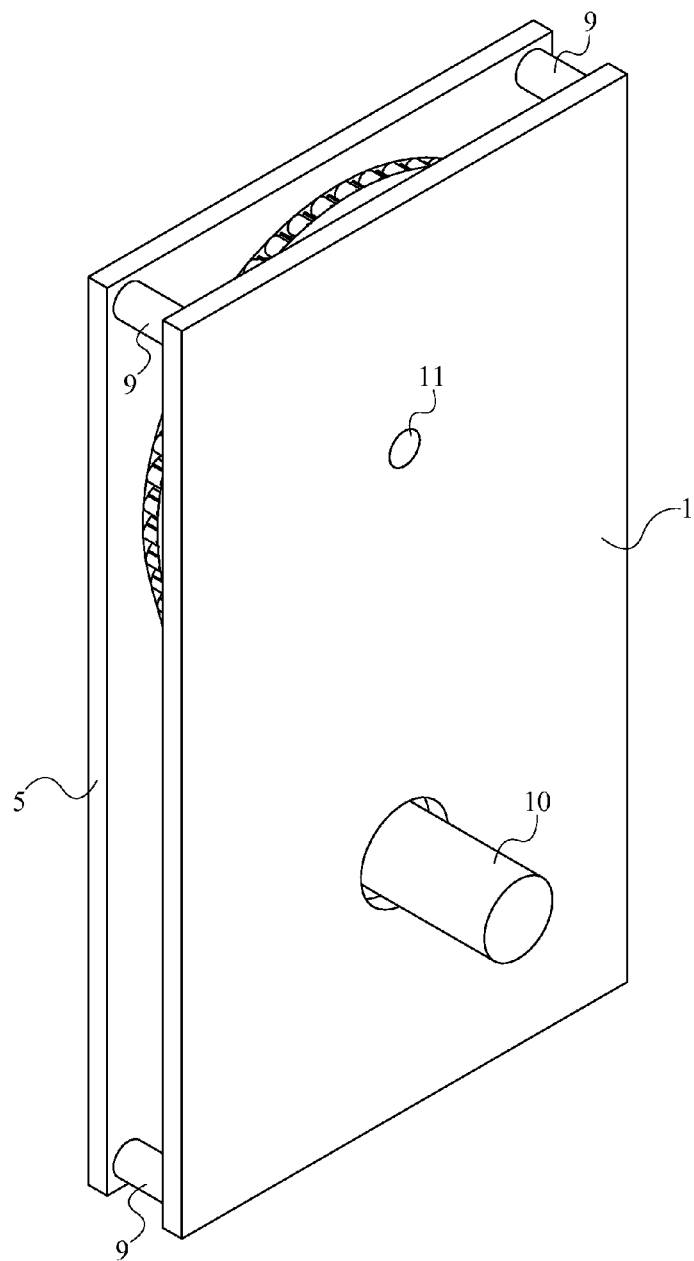
FIG. 1 is a front perspective view of the present invention.
Figure 2:
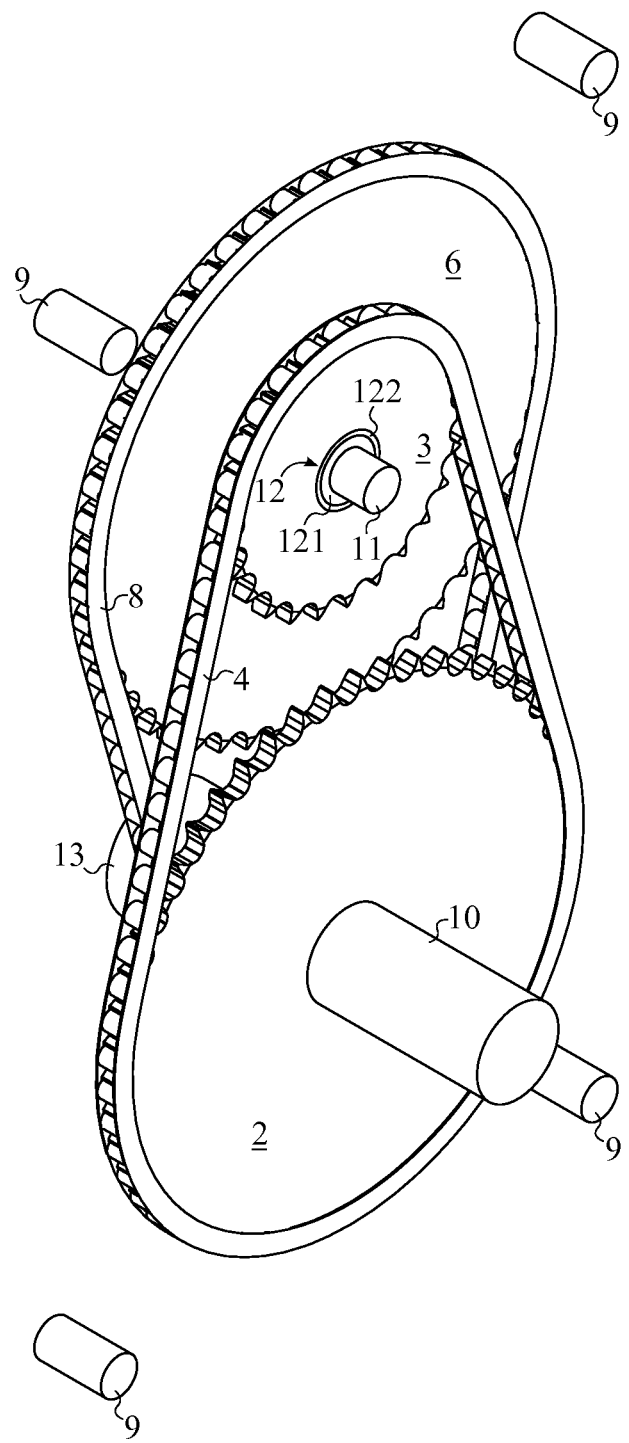
FIG. 2 is a front perspective view of the present invention without the adapter plates.
Figure 3:
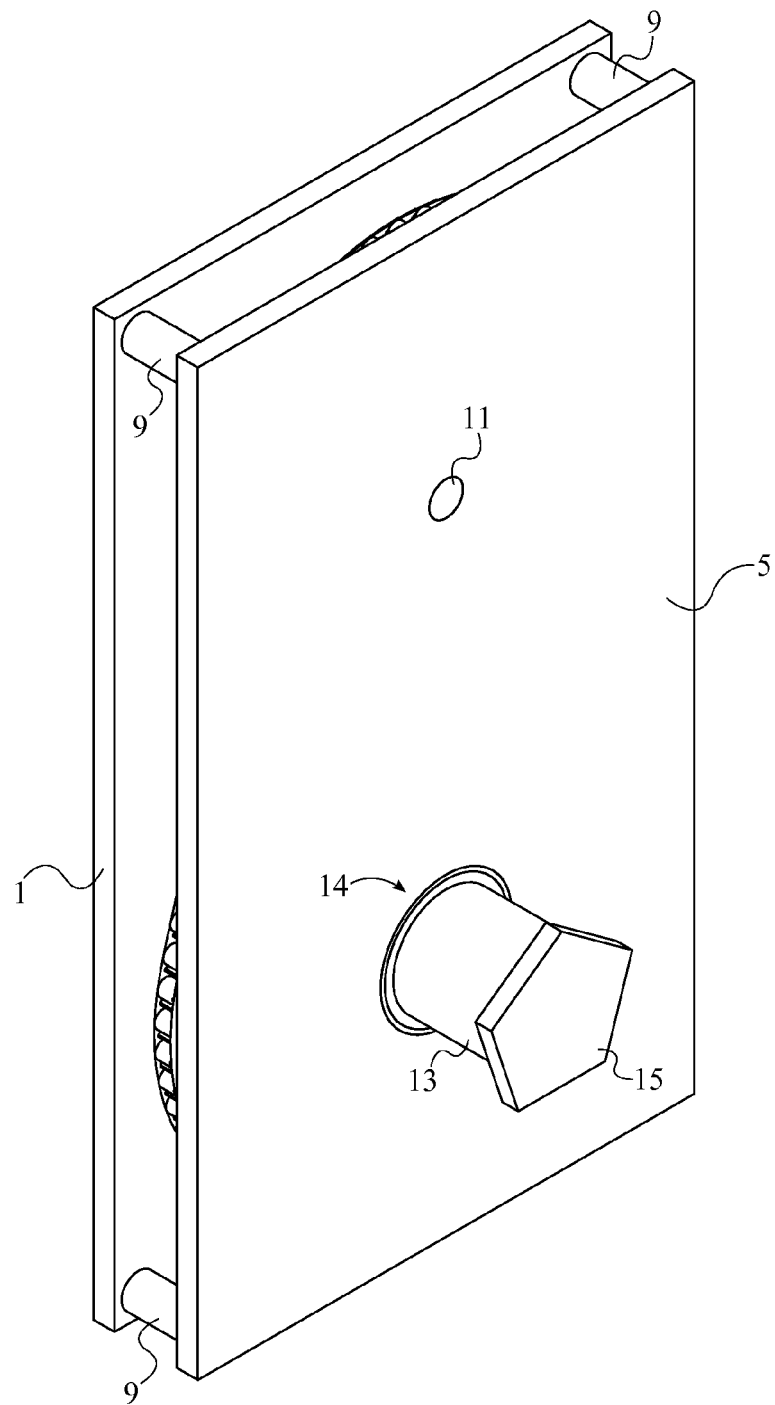
FIG. 3 is a back perspective view of the present invention.
Figure 4:
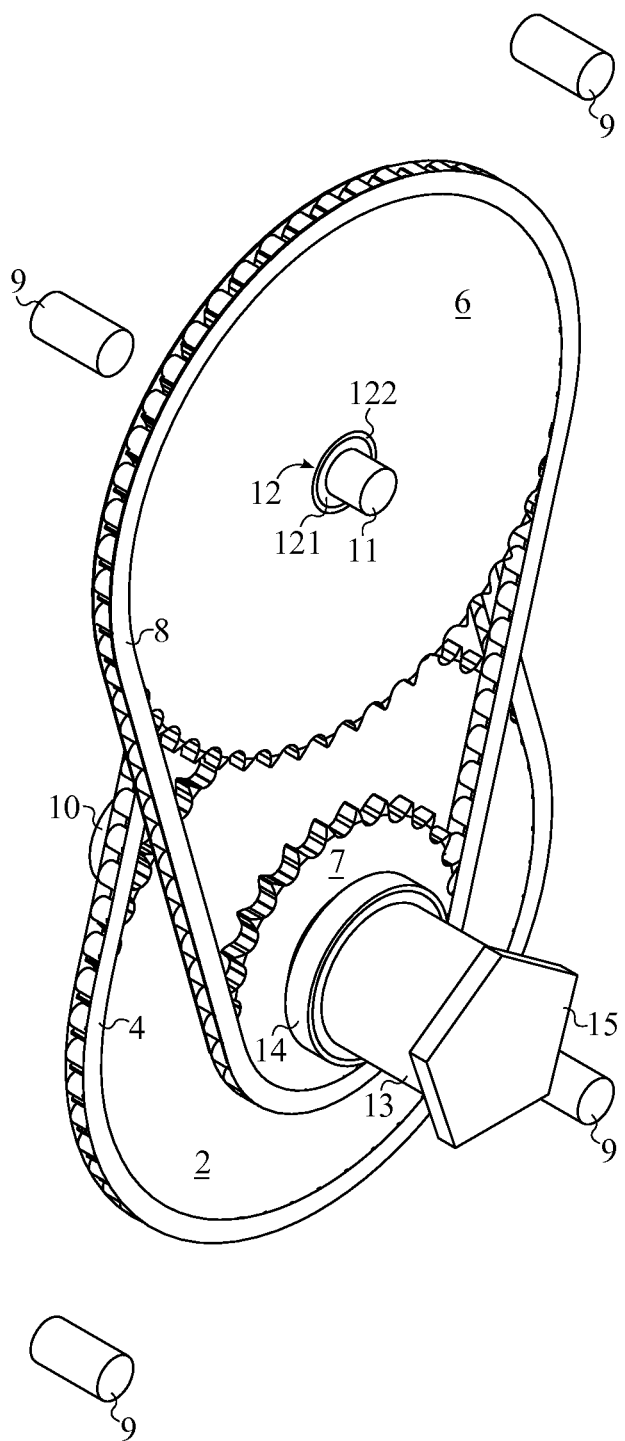
FIG. 4 is a back perspective view of the present invention without the adapter plates.
Figure 5:
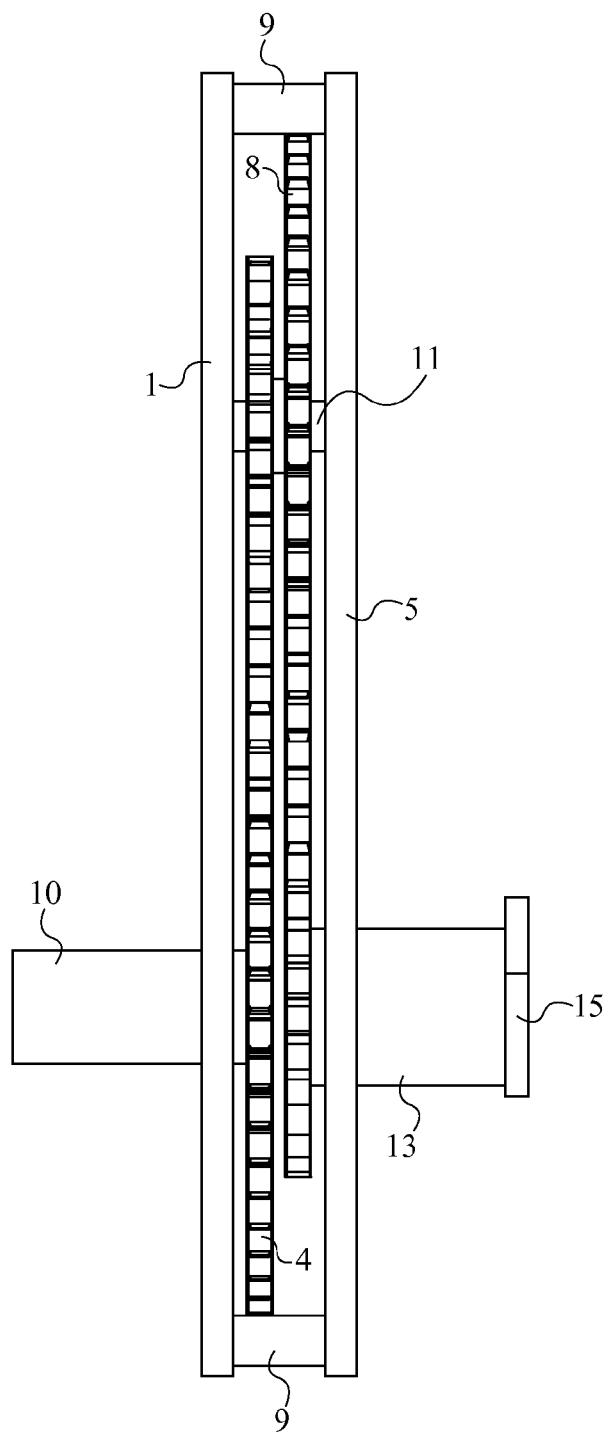
FIG. 5 is a side view of the present invention.
Figure 6:
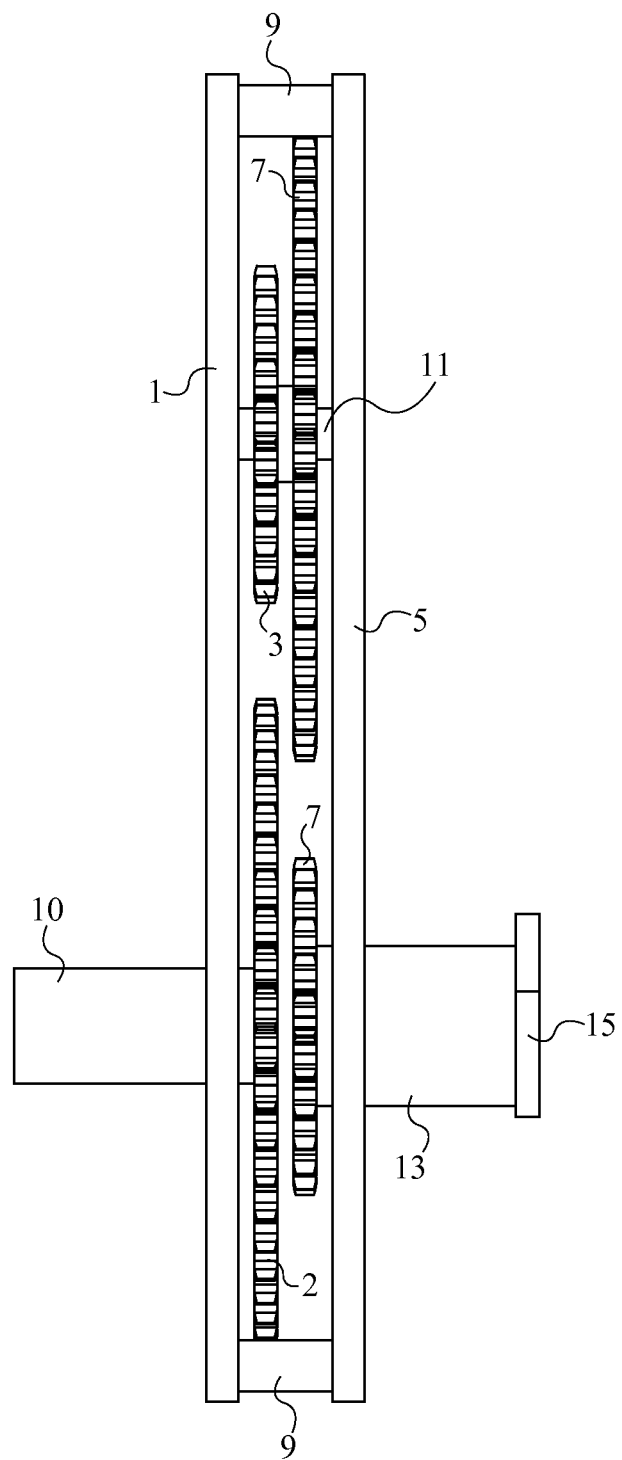
FIG. 6 is a side view of the present invention without the roller chains.

All illustrations of the drawings are for the purpose of describing selected versions of the present invention and are not intended to limit the scope of the present invention.

The present invention is a sprocket box for increasing the gas mileage of a vehicle with an automatic transmission. The present invention is used in between the engine and an automatic transmission in order to multiply the rotational speed of the crankshaft output into a torque converter. In the preferred embodiment, the rotational speed of the crankshaft output is doubled by the present invention. The present invention mainly comprises a first adapter plate 1, a first large sprocket 2, a first small sprocket 3, a first roller chain 4, a second adapter plate 5, a second large sprocket 6, a second small sprocket 7, a second roller chain 8, an idler shaft 11, an output shaft 13, and a torque converter adapter 15. These components are configured to multiply the rotational speed from the engine's crankshaft into the torque converter, which will increase the revolutions per minute (RPM) for the torque converter. The torque created by the crankshaft during the power stroke produces rotational motion in all four sprockets of the present invention.

In the preferred embodiment, the effect of the diameter ratio for the sprockets is that, for every one complete revolution of the crankshaft, the torque converter makes two complete revolutions. For example, when the crankshaft makes 25 complete revolutions, the torque converter makes 50 complete revolutions, which produces enough fluid pressure for the fluid pressure sensor to more efficiently shift through the gears of the automatic transmission. Since the transmission is built with gear ratios in itself, the combined effect of the diameter ratios in the sprocket box and the gear ratios in the automatic transmission enables a vehicle to achieve about 50% more mileage per gallon of fuel in comparison to the conventional direct drive of crankshaft-torque converter mechanism. For example, someone is driving in the expressway at 60 miles per hour (MPH), which usually requires the engine's RPM to be between 1500 and 2000 in the conventional direct drive crankshaft-torque converter mechanism. With the sprocket box, it will only require the engine's RPM to be between 800 and 1000 as the vehicle travels at 60 MPH, which consumes much less fuel per mile. In addition, the present invention is more environmentally friendly because less harmful gases will be emitted by the vehicle's exhaust pipe. In an alternate embodiment, the present invention is also beneficial for electric vehicles because the electric motor will draw less electricity from the battery per mile.

In terms of the configuration of the present invention, the first adapter plate 1 and the second adapter plate 5 are structural components that are used to support and properly position all of the other components for the present invention. In addition, the first adapter plate 1 allows the present invention to be mounted onto the engine block of an engine and is bolted to the engine block in the preferred embodiment of the present invention. The crankshaft output end 10 of the engine traverses through a hole in the first adapter plate 1 so that the first large sprocket 2 can be axially connected to the crankshaft output end 10. In the preferred embodiment, the first large sprocket 2 is bolted to the crankshaft output end 10 instead of the typical flywheel. The first large sprocket 2 allows the present invention to receive the rotational motion from the crankshaft output end 10. The first small sprocket 3 is rotatably mounted to the idler shaft 11, which allows the first small sprocket 3 to rotate in a parallel motion with the first large sprocket 2. Consequently, one end of the idler shaft 11 needs to be connected normal to the first adapter plate 1 and the other end of the idler shaft 11 needs to be connected normal to the second adapter plate 5 in order to support the first small sprocket 3. The first small sprocket 3 is also torsionally engaged to the first large sprocket 2 by the first roller chain 4 so that the rotational motion of the first large sprocket 2 is transferred to the first small sprocket 3. The first large sprocket 2, the first small sprocket 3, and the first roller chain 4 act together as an input sprocket assembly, which is the means to feed the rotational motion from an engine into the present invention.

Likewise, the second large sprocket 6, the second small sprocket 7, and the second roller chain 8 act together as an output sprocket assembly, which is the means to feed the rotation motion from the present invention into a torque converter. The second large sprocket 6 is also rotatably mounted to the idler shaft 11, which allows the second large sprocket 6 to rotate in a parallel motion with said first small sprocket 3. The second large sprocket 6 is axially connected to the first small sprocket 3 so that the second large sprocket 6 rotates as the first small sprocket 3 is rotating. Consequently, the rotational motion from an engine is transferred from the input sprocket assembly to the output sprocket assembly through the axial connection between the first small sprocket 3 and the second large sprocket 6. The output shaft 13 allows the output sprocket assembly to directly transfer the rotational motion from the output sprocket assembly into a torque converter. The output shaft 13 is positioned normal to the second adapter plate 5 and is rotatably mounted through the second adapter plate 5, which allows the output shaft 13 to freely rotate while being supported by the second adapter plate 5. The second small sprocket 7 is axially connected to the output shaft 13 so that the output shaft 13 rotates while the second small sprocket 7 is rotating. In addition, the second small sprocket 7 is torsionally engaged to the second large sprocket 6 so that the rotational motion of the second large sprocket 6 is transferred to the second small sprocket 7. Thus, the present invention will transmit the rotational motion from the engine to the torque converter at a specific gear ratio, which is determined by the first large sprocket 2 and the second small sprocket 7. Finally, the torque converter adapter 15 allows the present invention to couple to a torque converter in order to transfer rotational motion from the output sprocket assembly into the torque converter. The torque converter adapter 15 is axially connected to the output shaft 13 so that the torque converter adapter 15 will rotate as the second small sprocket 7 is rotating.

The first adapter plate 1 and the second adapter plate 5 are used as a structural housing for the moving components of the present invention. Thus, the first adapter plate 1 and the second adapter plate 5 are positioned parallel to each other so that the rotation axes of both the idler shaft 11 and the output shaft 13 to be parallel to the rotation axis of the crankshaft output end 10. The bell housing of the automatic transmission should also be modified to accommodate for the location and the attachment of the first adapter plate 1 and the second adapter plate 5. The second adapter plate 5 is connected adjacent to the first adapter plate 1 by a plurality of separator posts 9, which are used to provide a space between the first adapter plate 1 and the second adapter plate 5. The input sprocket assembly and the output sprocket assembly are located within this space and are consequently located in between the first adapter plate 1 and the second adapter plate 5. The plurality of separator posts 9 is positioned around the input sprocket assembly and the output sprocket assembly, which prevents the plurality of separator posts 9 from interfering with the mechanical movement of the input sprocket assembly and the output sprocket assembly. In an alternate embodiment, the present invention can be designed to directly connect to the engine block with the first adapter plate 1.

The present invention is configured to be integrated into the drive-train of a vehicle as an accessory, and the positioning of the vehicle's engine and automatic transmission should not have to be reoriented in order to accommodate the present invention. Thus, the present invention requires the rotation axis of the crankshaft output end 10 to be collinear with the rotation axis of the crankshaft output end 10, which allows the present invention to be simply installed in between a vehicle's engine block and its torque converter. However, if the output shaft 13 is concentrically positioned with the crankshaft output end 10, then transferring rotational motion through the present invention at the specific gear ratio becomes mechanically difficult. The idler shaft 11 is offset from the crankshaft output end 10 along the first adapter plate 1, which allows the present invention to output the rotational motion from an engine at the specific gear ratio while the crankshaft output end 10 and the output shaft 13 remain concentric to each other. In preferred embodiment, the idler shaft 11 is made of steel. In one embodiment, the idler shaft 11 is threaded on one end in order to connect to the first adapter plate 1 with a nut. Furthermore, the nut engaged to threaded end of the idler shaft 11 is secured by a cotter pin, which prevents the nut from loosening due to engine vibration.

In the preferred embodiment of the present invention, the first small sprocket 3 and the second large sprocket 6 acts as idler gears and are simply used as a means to transfer the rotational motion from the first large sprocket 2 to the second small sprocket 7. Consequently, the first small sprocket 3 and the second large sprocket 6 are rotatably mounted to the idler shaft 11 by a shared bearing 12, which includes an inner race 121 and an outer race 122. The outer race 122 is rotatably connected around the inner race 121 so that the first small sprocket 3 and the second large sprocket 6 are able to freely rotate about the idler shaft 11. The first small sprocket 3 is connected around the outer race 122 of the shared bearing 12, and the second large sprocket 6 is connected around the outer race 122 of the shared bearing 12 so that the second large sprocket 6 rotates as the first small sprocket 3 is rotating. In addition, the first small sprocket 3 and the second large sprocket 6 are positioned opposite to each other along the shared bearing 12 so that the first small sprocket 3 is inline with the rest of the input sprocket assembly and the second large sprocket 6 is inline with the rest of the output sprocket assembly. In the preferred embodiment, the shared bearing 12 is a cylindrical roller bearing that is packed with high temperature bearing grease so that the first small sprocket 3 and the second large sprocket 6 can rotate smoothly on the idler shaft 11.

The first roller chain 4 is the means of transferring rotational motion within the input sprocket assembly, and the second roller chain 8 is the means of transferring rotational motion within the output sprocket assembly. More specifically, the first roller chain 4 is closed loop around the first large sprocket 2 and the first small sprocket 3, which allows the first roller chain 4 to continuously transfer rotational motion from the first large sprocket 2 to the first small sprocket 3. Similarly, the second roller chain 8 is closed loop around the second large sprocket 6 and the second small sprocket 7, which allows the second roller chain 8 to continuously transfer rotational motion from the second large sprocket 6 to the second small sprocket 7. In one embodiment of the present invention, the first roller chain 4 and the second roller chain 8 have a double-chain style, and the first large sprocket 2, the first small sprocket 3, and the second large sprocket 6, and the second small sprocket 7 are each configured with two sets of teeth in order to accommodate the double-chain style, which is more structurally stable than using the single-chain style.

In addition to transferring the rotational motion from the present invention to the torque converter, the output shaft 13 needs to be sturdy enough to support the weight of the torque converter. The output shaft 13 is supported by the second adapter plate 5 and, thus, is rotatably mounted through the second adapter plate 5 by an output bearing 14, which allows the output shaft 13 to freely rotate while being mounted to the second adapter plate 5. In the preferred embodiment of the present invention, the output bearing is also a cylindrical roller bearing that is packed with high temperature bearing grease so that the output shaft 13 can rotate smoothly within the second adapter plate 5. The second small sprocket 7 is connected around the output shaft 13 adjacent to the output bearing 14 so that the output shaft 13 rotates as the second small sprocket 7 is rotating. The torque converter adapter 15 is connected around the output shaft 13 adjacent to the output bearing 14 and opposite to the second small sprocket 7 so that the torque converter adapter 15 rotates as the output shaft 13 is rotating. In the preferred embodiment, the torque converter adapter 15 is designed to attach to the flywheel of a torque converter and is provided with stud bolts that correspond to the holes in the flywheel. This configuration also positions the second small sprocket 7 within the structural housing formed by the first adapter plate 1 and the second adapter plate 5 and positions the torque converter adapter 15 outside of that structural housing.

For the present invention, it may be necessary to install a relief valve that will release the fluid pressure through the transmission housing, while the vehicle is standing idle, like at a stop sign or stop light. When the vehicle is not moving, a high fluid pressure within the automatic transmission may damage some of its internal parts. The relief valve will be pre-set at a certain pressure value and can be electrically activated as soon as the driver steps on the brake pedal. The fluid then will be released into a reservoir and will be pumped back into the automatic transmission as soon as the driver lifts his foot from the brake pedal.

The present invention can be used in conjunction with modifications to the journal arms within a crankshaft. These combinations will further reduce the amount of fuel needed to feed the engine and still produce the same amount of torque to turn the crankshaft. If the journal arm is 2 inches long, then the pressure acting on the head of the piston is 2000 pressure per square inch (PSI) during the power stroke. That pressure force applied on the rod journal (or yoke) through the connecting rod in order to turn the crankshaft. To find the torque, multiply the force by the length of the moment arm (journal arm) from its axis. Therefore, the torque created by a 2-inch journal arm is 2 inches times 2000 PSI, which is equal to 4000 inch-pound. Thus, more torque can be created by increasing the length of the journal arm. For example, if 0.5 inches is added to the length of the journal arm, then the torque created by the 2.5-inch journal arm is 5000 inch-pound. In this example, there is a gain of 1000 inch-pound with the same amount of pressure force at 2000 PSI. In addition, to further save the amount of fuel, just reduce the amount of fuel that is fed into the engine by 0.5%, and the piston will still produce 4000 inch-pound of torque. The modification to the journal arms is best suited for the V-arrangement for cylinders so that such modifications produce only un-noticeable vibrations of the engine.

Although the invention has been explained in relation to its preferred embodiment, it is to be understood that many other possible modifications and variations can be made without departing from the spirit and scope of the invention as hereinafter claimed.

What is claimed is:

1. A sprocket box for increasing the gas mileage of a vehicle with an automatic transmission comprises:
   a crankshaft output end traversing through a first adapter plate;
   a first large sprocket being axially connected to said crankshaft output end;
   an idler shaft being connected normal to said first adapter plate;
   a first small sprocket being rotatably mounted to said idler shaft;
   said first small sprocket being torsionally engaged to said first large sprocket by a first roller chain;
   a second large sprocket being rotatably mounted to said idler shaft;
   said second large sprocket being axially connected to said first small sprocket;
   said idler shaft being connected normal to a second adapter plate;
   an output shaft being positioned normal to said second adapter plate;
   said output shaft being rotatably mounted through said second adapter plate;
   a second small sprocket being axially connected to said output shaft;
   said second small sprocket being torsionally engaged to said second large sprocket by a second roller chain;
   a torque converter adapter being axially connected to said output shaft;
   said first adapter plate and said second adapter plate being positioned parallel to each other;
   said second adapter plate being connected adjacent to said first adapter plate by a plurality of separator posts;
   said first large sprocket, said first small sprocket, said first roller chain, said second large sprocket, said second small sprocket, and said second roller chain being located in between said first adapter plate and said second adapter plate; and
   said plurality of separator posts being positioned around said first large sprocket, said first small sprocket, said first roller chain, said second large sprocket, said second small sprocket, and said second roller chain.

2. The sprocket box for increasing the gas mileage of a vehicle with an automatic transmission as claimed in claim 1 comprises:
   said idler shaft being offset from said crankshaft output end along said first adapter plate; and
   said output shaft being concentrically positioned with said crankshaft output end.

3. The sprocket box for increasing the gas mileage of a vehicle with an automatic transmission as claimed in claim 1 comprises:
   said first small sprocket and said second large sprocket being rotatably mounted to said idler shaft by a shared bearing;
   said first small sprocket and said second large sprocket being positioned opposite to each other along said shared bearing;
   said first small sprocket being connected around an outer race of said shared bearing; and
   said second small sprocket being connected around said outer race of said shared bearing.

4. The sprocket box for increasing the gas mileage of a vehicle with an automatic transmission as claimed in claim 1 comprises:
   said output shaft being rotatably mounted through said second adapter plate by an output bearing;
   said second small sprocket being connected around said output shaft adjacent to said output bearing; and
   said torque converter adapter being connected around said output shaft adjacent to said output bearing and opposite to said second small sprocket.

5. The sprocket box for increasing the gas mileage of a vehicle with an automatic transmission as claimed in claim 1 comprises:
   said first roller chain being a closed loop around said first large sprocket and said first small sprocket; and
   said second roller chain being another closed loop around said second large sprocket and said second small sprocket.

* * * * *